June 30, 1953     R. A. HALVERSEN     2,643,935
PROCESS FOR MAKING ALUMINUM OXIDE
Filed April 1, 1948
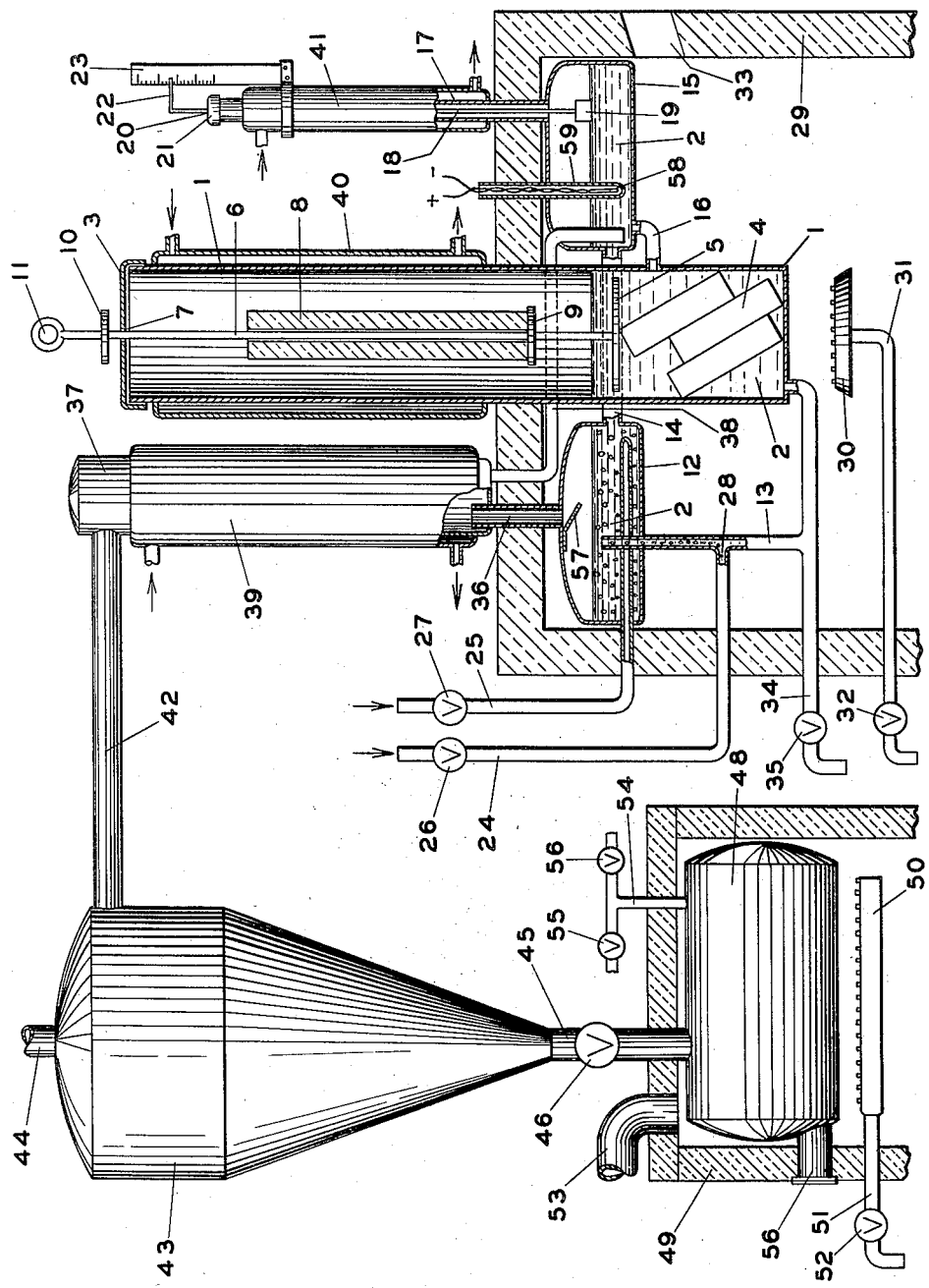
INVENTOR.
ROY A. HALVERSEN
BY Lindley E. Mills Patented June 30, 1953

2,643,935

UNITED STATES PATENT OFFICE 2,643,935

PROCESS FOR MAKING ALUMINUM OXIDE

Roy A. Halversen, Cleveland Heights, Ohio, assignor to Parker Halversen Company, Niles, Mich., a corporation of Michigan Application April 1, 1948, Serial No. 18,342

1 Claim. (Cl. 23—141)

This invention relates to a process for preparing aluminum oxide, particularly to a process for the preparation of aluminum oxide in finely divided form. This application is a continuation-in-part of application Serial No. 780,492, filed October 17, 1947, now abandoned.

Aluminum oxide is a hard, relatively inert substance with properties which indicated it should find use in the field of abrasives, pigments, heat and sound insulators and in many other fields. It forms a white powder when crushed which is not discolored by hydrogen sulfide, sulfur dioxide or other gases frequently found in small amounts in the atmosphere.

The inherent hardness of aluminum oxide has, however, heretofore prevented its finding extensive use in many fields because of the difficulty of grinding it into a sufficiently fine powder. For many uses, a powder with an average particle size of not more than a few microns is essential and no convenient economical process has been devised for reducing aluminum oxide to a powder of such fineness. It is apparent that a process whereby aluminum oxide could be formed in an initially finely divided state without the necessity of grinding would be of great value.

It is, therefore, an object of the present invention to provide a method for the preparation of aluminum oxide.

An additional object is to provide a method for the preparation of aluminum oxide in initially finely divided form.

An additional object is to provide a method for reacting aluminum with water vapor to form aluminum oxide in finely divided form.

An additional object is to provide a method for reacting aluminum with steam to form hydrogen and aluminum oxide in finely divided form.

An additional object is to provide aluminum oxide in finely divided form and characterized by a high degree of surface activity.

An additional object is to provide apparatus in which the said process can be carried out.

These and related objects are accomplished readily by dissolving aluminum in mercury at an elevated temperature to form an aluminum amalgam and contacting the amalgam with water vapor, preferably at a temperature above about 100° C. in the form of steam or of a mixture thereof with other gases. When the process is carried out as herein described, the so-formed aluminum oxide is in the form of a finely divided powder having an average particle size less than about 5 microns, usually less than about 1 micron. The powder can be swept from the vessel containing the amalgam in the form of a suspension of extremely fine particles in the hydrogen formed or in the mixture thereof with other gases used as diluents for the steam. In the case where air, for example, is used as a diluent for the steam, the process is carried out conveniently by bubbling a mixture of air and steam through the amalgam in a vessel, the finely divided aluminum oxide being swept out of the vessel in the gas stream consisting of hydrogen, nitrogen and any unreacted oxygen and subsequently separated therefrom in conventional manner, e. g. in a centrifugal separator or electrostatically. The mercury remaining, which may contain unreacted aluminum, is recycled in the process, and the gases remaining after separation of the aluminum oxide powder can be utilized in any convenient way. By proper operation of the process, substantially all of the oxygen can be removed from steam leaving the hydrogen in highly purified form except for diluent gases which may have been used. A preferred diluent gas is hydrogen, the effluent gases from the process then consisting of substantially pure hydrogen.

It is well known that aluminum is difficult to amalgamate with mercury when the two substances are simply contacted with one another at ordinary temperatures. The thin film of aluminum oxide, which forms immediately when a fresh surface of the metal is exposed to the atmosphere, protects the aluminum effectively from the action of mercury at ordinary temperatures. The preparation of an aluminum amalgam under such conditions is time consuming and impractical. Furthermore, aluminum is only very slightly soluble in mercury at ordinary temperatures.

It has now been found that when aluminum, e. g. aluminum in the form of rods, billets, pigs, sheets, chunks, scrap or other available forms, is contacted with mercury at a temperature above about 100° C., preferably with liquid mercury at a temperature between about 300° C. and the boiling point of mercury, the mercury penetrates the film of oxide on the metal readily and the aluminum is dissolved rapidly to form a liquid amalgam consisting of a saturated solution of aluminum in mercury. Such amalgam contains about 0.25 per cent by weight of aluminum. This hot solution or amalgam of aluminum in mercury reacts readily with steam, either when pure or when mixed with other gases, to form aluminum oxide having an extremely small particle size. The oxide can then be removed readily from the amalgam as indicated previously by blowing a gas through the amalgam. Alternatively the amalgam can be prepared readily by subjecting aluminum, e. g. in a tower or column, to the action of mercury vapor and draining the amalgam from the remaining aluminum.

Due to the fact that the steam is contacted with the amalgam at an elevated temperature and due to the fact that the reaction is exothermic, considerable mercury vapor is carried along with the mixture of gas and aluminum oxide particles leaving the contacting zone. Most of this mercury can be condensed and returned to the system by cooling the suspension prior to separation of the aluminum oxide. Small traces of mercury which are adsorbed on the aluminum oxide and traces of oxides of mercury, which may be formed and carried along with the aluminum oxide, can be removed readily by heating or firing the separated aluminum oxide, e. g. to a temperature of 350° to 500° C., or higher, to decompose mercury oxides and volatilize mercury. Heating can be carried out in vacuo, if desired. In the event the aluminum oxide contains carbon, e. g. from carbon present in the aluminum starting material, or from organic impurities, e. g. from dust from the air used, these can be removed by heating to a higher temperature in air. The aluminum oxide can thus be freed entirely of mercury or mercury compounds. Any small agglomerations of aluminum oxide particles in the final product are readily crushed by passing the product between light rolls.

Although water vapor is preferably introduced into the process in the form of substantially pure steam and hydrogen is recovered in substantially pure form, mixtures of water vapor and other gases can be used, if desired. In many instances, a mixture of steam and air can be used and all of the steam and all or a portion of the oxygen of the air reacted with aluminum to form aluminum oxide and a gaseous mixture of hydrogen and nitrogen recovered which may also contain oxygen. Many such hydrogen- and oxygen-containing gaseous mixtures are, of course, explosive and when this hazard is to be avoided, diluents other than air can be used with the steam. Such other diluent gases include hydrogen and nitrogen, as well as certain hydrocarbons and fluoro- or other halohydrocarbons. Mixtures of such diluent gases can be used if desired. An excess of steam can be used to perform the function of a diluent. Steam containing hydrogen sulfide or sulfur dioxide is preferably avoided.

One modification of the invention contemplates the introduction of liquid water in the form of a fine stream or as droplets into contact with the heated amalgam, preferably below its surface, and the formation of water vapor in situ. Another modification contemplates the atomization of liquid water in a stream of diluent gas and introduction of the suspension of fine droplets into the amalgam.

Another modification contemplates the utilization as a diluent of a gaseous material which, under the conditions prevailing in the reaction zone, is itself reactive either with the hydrogen formed or with other components present or introduced into the reaction zone or which may undergo pyrolytic decomposition in the reaction zone under the influence of the metal oxides present. Thus, certain unsaturated hydrocarbons can be reduced in the reaction zone to saturated hydrocarbons, particularly when traces of metals whose oxides catalyze hydrogenation reactions are included in the amalgam as will be mentioned subsequently. Certain ketones can be reduced in similar manner. Gases containing chemically combined oxygen which react readily with aluminum amalgam at an elevated temperature to form aluminum oxide can also be used in the process mixed with water vapor and the use of such additional sources of oxygen is contemplated by one modification of the invention. Among such additional gases may be mentioned the vapors of certain alcohols, esters, aldehydes and ketones. Valuable by-products, such as hydrogen and unsaturated hydrocarbons, are often formed when using gases containing chemically bound oxygen.

Aluminum from substantially any source can be used in the process. Billets or pigs produced electrolytically can be used in the process as can also scrap aluminum, such as turnings, trimmings, scrap sheet, rods, castings and the like. Most aluminum alloys, such as alloy scrap containing manganese, can be used in the process, the manganese and any other alloying metals incapable of amalgamating with mercury rising to the top of the mercury in the amalgamating vessel from which they can be recovered in convenient manner, e. g. by drawing off the upper layer of liquid and distilling the mercury. In instances where an alloy is used which contains a metal which amalgamates with mercury and which is easily oxidized, a certain amount of contamination of the aluminum oxide product with the oxide of the alloying metal may occur and the use of such alloys should be avoided when such contamination is undesirable.

It should be noted, however, that the method furnishes a convenient way in which to prepare aluminum oxide containing desired traces of oxides of other metals, particularly of other metals which form amalgams with mercury. The presence of small portions of the oxides of other metals in aluminum oxide often contributes in a valuable way to the catalytic activity of the mixture. Such mixed oxides can be prepared by using aluminum or an amalgam containing desired proportions of advantageous metals and carrying out the process substantially as described. Oxides which can be incorporated in aluminum oxide in this way include the oxides of sodium, potassium, lithium, calcium, magnesium, strontium, copper, gold, zinc, cadmium, silver, lead, palladium, platinum, tin and others. In the case of many other metals, e. g. in the case of manganese, iron, nickel, cobalt and other metals not ordinarily considered as forming amalgams with mercury, the metal can be added to the amalgam in powder form or as an alloy and its oxide formed along with the aluminum oxide.

Although the reaction of water vapor with aluminum is usually carried out at substantially the same temperature as that at which the aluminum amalgam is formed, this is not necessary and may, in certain instances, not be desirable. Thus, although the reaction of the aluminum in the amalgam with water vapor proceeds fairly rapidly at temperatures as low as approximately 100° C., or even lower, the solubility of aluminum in mercury is so low at temperatures in the neighborhood of 100° C., or lower, that an unduly large volume of mercury must be cycled in the process per unit weight of aluminum oxide produced when the amalgamation step is carried out at this temperature. Also, when an amalgam or solution of aluminum in mercury which is saturated at 300° to 360° C. is cooled, aluminum in excess of that soluble at the lower temperature separates in solid form and the amalgam becomes thickened and difficult to handle. It is even possible and convenient, by separating insoluble matter from such a hot solution, to cool the solution and filter crystallized aluminum from the cooled mixture. Distillation of the mercury from the crystallized aluminum leaves the aluminum in very highly purified form. Aluminum free of traces of iron, nickel, manganese and other non-amalgamating metals can be prepared readily in this way.

Aluminum oxide prepared by the method of the invention is a fluffy white or slightly greyish powder which usually weighs from about one to about five pounds per cubic foot. It can be compressed easily to considerably less than half its volume, and can then be fluffed up by agitating or beating to approximately its original state. It is amorphous or very finely crystalline in form, the average particle size generally being less than 5 microns and usually less than about 1 micron.

It is remarkable that the aluminum oxide prepared by the method of the invention exists, prior to firing to remove adsorbed mercury and to decompose mercury oxides, almost entirely in what is probably the gamma form and is substantially completely soluble in cold, dilute hydrochloric acid. After firing, particularly when temperatures up to about 800° C. or higher are employed, it appears that about half the product is converted to what is probably the alpha form and as such is no longer soluble in cold dilute hydrochloric acid. It appears that both a time and a temperature factor is involved in the conversion of the gamma form to the alpha form and that either continued firing or an increase in the firing temperature increases the proportion of oxide insoluble in dilute hydrochloric acid. One convenient way of converting the gamma oxide at least partially to the alpha form, and of decomposing mercury oxides which may be present, comprises passing the suspension of oxide and hydrogen, and after mixing therewith sufficient air or oxygen to combust at least a part of the hydrogen, through a zone wherein such combustion is carried out and wherein the aluminum oxide particles are subjected to the high temperature of the hydrogen flame.

When used as a pigment in paints, the aluminum oxide prepared by the method herein described has excellent covering power and is not subject to discoloration by atmospheric gases. Due to its hardness and finely divided form, it is a valuable constituent of abrasive and polishing compositions, polishing wheels, and the like. The product as formed is also an excellent heat and sound insulator as is also the case when it is combined with a binder and formed into dimensionally stable units of somewhat greater density. Suitable binders include silicates, phosphates, organic adhesives and many others, the formed shape usually being fired to set the binder and remove volatile substances.

Aluminum oxide prepared by the method of the invention, is a highly adsorptive substance and is of value as a desiccating agent and as a decolorizing agent. It can be used efficiently in gas masks, in the recovery of organic vapors from gas mixtures, and for many other similar purposes. It has been found that, due to its high adsorptive power it will adsorb dyes from solutions thereof in water or organic liquids and that these colored compounds are retained after long and repeated washing with liquids in which the dyes are normally soluble. In this way, the aluminum oxide can be converted into valuable pigments of substantially any desired color or shade.

A further utility of the finely divided aluminum oxide is in the field of catalysts for chemical reactions. It is an effective catalyst in the cracking of petroleum and in the pyrolytic decomposition of many other types of organic compounds such as alcohols and certain halogen compounds, to yield valuable products. For such use, the aluminum oxide can, if desired, be formed into briquettes or other shapes, as mentioned previously. In certain instances involving liquid phase reactions, the powder is suspended in the liquid by gentle agitation. Due to its light, fluffy nature, the powder can be suspended in a gas stream and the mixture passed through a reaction zone to effect a desired catalytic effect on the gas. The product is also valuable as a filler in the plastics, rubber, and other arts and in the manufacture of synthetic gems.

As an abrasive for polishing and grinding compositions, the finely divided aluminum oxide has certain outstanding advantages. Glass can be rough ground and then finish ground and polished rapidly in one operation to produce an optical finish. Plastic articles, lacquered, varnished or printed surfaces and wooden articles can be polished to a smooth glistening surface with a minimum of effort. The aluminum oxide can, for such purposes, be used dry or it can be included in a paste or cream or suspended in a liquid along with other ingredients, such as waxes, oils, cleansers and the like.

For a better understanding of the process of the invention, reference is made to the accompanying drawing wherein there is shown apparatus in which the process can be carried out, it being understood that the process is not limited as to apparatus.

In the apparatus shown in the drawing, a vertically elongated amalgamating pot 1 is provided, the lower portion of which is adapted to contain liquid mercury or aluminum amalgam 2. The upper portion of the amalgamating pot 1 is provided with a loose-fitting cover 3 which can be removed for charging billets or other pieces of metallic aluminum 4 into the pot. Since metallic aluminum has a specific gravity less than that of liquid mercury, it will normally float on the mercury except when the amalgamating pot 1 is loaded with sufficient aluminum to keep the lower pieces weighted down and submerged. Alternatively, means can be provided to hold the pieces of aluminum below the surface of the mercury in the pot. One convenient apparatus for accomplishing this comprises a horizontal submerging plate 5 having a diameter somewhat less than the internal diameter of the pot 1 and mounted on the lower end of a rod 6 which extends through a port 7 in the loose-fitting cover 3. The rod 6 and plate 5 can be weighted as by a weight 8 supported on lugs 9 attached to the rod 6 or it can be spring loaded in any convenient fashion. Lugs 10 can be mounted on the upper end of the rod 6 to control the depth to which the plate 5 is forced into the liquid amalgam and the rod 6 can be provided with an eyelet 11 or other means for lifting it out of the pot.

A reaction pot 12 is also provided into which aluminum amalgam can be forwarded from the amalgamating pot 1 by way of a suitable liquid transfer conduit 13. An overflow conduit 14 is provided for return of spent amalgam from the reaction pot 12 to the amalgamating pot 1. This return may be by way of a reservoir 15 and a reservoir drain conduit 16 to increase the inventory of mercury in the system.

In the modification shown, the reservoir 15 is provided with a vertical gauge tube 17 through which extends a riser rod 18 having a float 19 mounted on its lower end and resting on the surface of the spent amalgam 2 in the reservoir 15. The upper end of the riser rod 18 extends through a port 20 in a cover 21 on the upper end of the gauge tube 17 and has mounted on it above the cover 21 an indicator 22 for indicating on a scale 23 the depth of spent amalgam in the reservoir 15. Since there is free flow of amalgam from the reaction pot 12 through the reservoir 15 back into the amalgamating pot 1, the level of amalgam in these three vessels is the same. A thermocouple 58 is also provided, suitably located in a well 59 in the reservoir 15, for determining the temperature of the amalgam in the system.

The reaction pot 12, the lower portion of the amalgating pot 1 in which the amalgamation step is carried out and the reservoir 15 are supported by means not shown and enclosed in an insulated chamber 29 which can be heated, e. g., by a gas burner 30 supplied with gas by way of a gas line 31 and a control valve 32, exhaust gases leaving the chamber 29 by way of a flue 33. A drain conduit 34 and a valve 35 are also provided for draining the mercury or amalgam from the entire system when desired.

A conduit 24 and a control valve 26 are provided for introducing steam or a mixture of water vapor and a diluent gas into contact with the aluminum amalgam in the reaction pot 12. This is conveniently accomplished by injecting the steam or gas mixture into the conduit 13 at a point 28 between the amalgamating pot 1 and the reaction pot 12 such that it rises in the conduit and forwards amalgam through the conduit into the reaction pot and thus effects circulation of the amalgam throughout the entire system. Other means, such as a suitable pump can, of course, be utilized for effecting such circulation. If desired, an additional conduit 25 and control valve 27 can be provided for introducing steam or a mixture of water vapor and a diluent gas directly into the amalgam in the reaction pot 12 rather than by way of conduit 13. Alternatively steam can be introduced into the pot through either of the conduits 24 or 25 and a diluent gas through the other. In this way, the rate of circulation of amalgam in the system and the rate of introduction of steam of other gas mixtures into the reaction pot 12 can be regulated by means of control valves 26 and 27 substantially independent of one another.

The reaction pot 12 is fitted with a vapor conduit 36 for conducting vapors and suspended aluminum oxide from the pot 12 into a condenser 37 wherein mercury vapors which are swept out of the reaction pot 12 by the stream of gas are condensed. These are returned to the liquid zone, e. g., by way of a return conduit 38 extending below the surface of the spent amalgam in the reservoir 15. Means, such as a baffle 57, can be provided to prevent entry of suspended droplets of mercury or amalgam into the vapor conduit 36. Jackets 39, 40 and 41 are provided for the condenser 37, for the non heated portions of the amalgamating pot 1 and for the vertical gauge tube 17, respectively, through which cooling water can be circulated to minimize the escape of mercury vapor therefrom.

A conduit 42 is provided for conveying the mixture of aluminum oxide particles and gas from the upper end of the condenser 37 to a separator 43 wherein the particles of aluminum oxide are separated and from which gaseous components escape by way of a vent 44. The settled aluminum oxide particles are conducted from the separator 43, e. g., by way of a conduit 45 and a control valve 46 to a firing chamber 48 which is enclosed in an insulated chamber 49 and which can be heated, e. g. by a gas burner 50 supplied through a gas line 51 and a control valve 52. Stack gases from the burner 50 escape from the insulated chamber 49 by way of a stack 53.

The firing chamber 48 can be equipped with suitable conduit 54 and control valves 55 and 56 by way of which the pressure in the chamber 48 can be decreased or equalized with the atmosphere as desired. The firing chamber 48 is also equipped with a manhole and cover 56 for removal of aluminum oxide from the chamber after firing. If desired, duplicate firing chambers and accessories can be provided so that aluminum oxide from the separator 43 can be collected in one chamber while the other is being fired and emptied.

To operate the process utilizing the equipment shown in the drawing, lifting means, not shown, are connected to the eyelet 11 at the upper end of the weighted rod 6 and the entire assemblage, including the rod 6, the weight 8, the submerging plate 5 and the amalgamating pot cover 7, are lifted out of the amalgamating pot 1 and, after charging a suitable quantity of aluminum into the pot, the entire assemblage is replaced. Mercury is introduced into the system, e. g. by way of valve 35 and drain conduit 34, or in any other convenient way, until the indicator 22 indicates it to be at a suitable level in the apparatus. The amalgamating pot and contents are then heated by means of the gas burner 30, the liquid in the reaction pot 12 and the reservoir 15 also being heated by convection or by introduction of a circulating gas into the transfer conduit 13. After the temperature of the liquid in the apparatus has reached about 100° C. or higher, steam or a mixture of steam and a diluent gas is introduced into the reaction pot 12 by way of conduits 24 or 25 as previously described. Circulation of amalgam in the system is thus effected and heating is continued until the desired temperature of the amalgam is attained and the heating then regulated to maintain approximately this temperature.

Gases from the reaction pot 12 carrying aluminum oxide particles suspended as a fine dust flow through the condenser 37, mercury vapor being condensed therein and returned to the reaction pot by way of return conduit 38, and thence into the separator 43 from which the aluminum oxide is dropped into the firing chamber 48 and from which gaseous constituents escape by way of vent 44 to be either discarded or to be utilized in any suitable manner. When the firing chamber 48 is substantially full of aluminum oxide, the control valve 46 is closed and additional aluminum oxide either collected in the lower part of the separator 43 or allowed to drop into a second firing chamber if such is provided.

The firing chamber 48 is then heated, preferably while evacuated, to decompose oxides of mercury and to volatilize the last traces of metallic mercury from the aluminum oxide. The manhole cover 56 is subsequently removed and aluminum oxide withdrawn from the firing chamber. Mercury volatilized during the firing operation can be condensed and returned to the system.

When using scrap aluminum alloys in the process, it is found that the metals in the alloys which do not amalgamate with mercury, such as iron and manganese, collect as a sludge on top of the mercury in the amalgamating pot 1 and that only pure liquid amalgam enters the reaction pot 12. Periodically, the upper portions of the amalgam in the pot can be drawn off, e. g. by way of a suitable valve, not shown, and distilled in a retort or filtered to recover mercury. The iron, manganese and other metals recovered furnish a valuable by-product from the process.

I claim:

The method which includes: bubbling a stream of gas comprising water vapor through a liquid aluminum amalgam in a reaction zone at a temperature above about 100° centigrade to agitate the amalgam and cause the formation of aluminum oxide having an average particle size less than about 5 microns; sweeping the aluminum oxide from the reaction zone in the gas stream substantially as fast as it is formed; and subsequently separating the aluminum oxide in highly purified form from the gas stream.

ROY A. HALVERSEN.

References Cited in the file of this patent

Richards "Chemical News," 74, 30 (1896).

Ormandy et al., J. Chem. Soc. 57, 812, lines 21—24 (1890).

Mellor, Inorganic and Theoretical Chemistry, vol. 5, pages 240, 241 and 242. Published in 1924 by Longmans, Green and Co., London.

Jourdain, Comptes Rendus, vol. 150, pp. 1602–4, (1910).